(12) United States Patent
Fukasawa

(10) Patent No.: US 6,659,569 B2
(45) Date of Patent: Dec. 9, 2003

(54) VEHICLE BRAKING CONTROL METHOD AND APPARATUS

(75) Inventor: Tsukasa Fukasawa, Nishikamo-gun (JP)

(73) Assignee: Toyota Jidosha Kabushiki Kaisha, Toyota (JP)

( * ) Notice: Subject to any disclaimer, the term of this patent is extended or adjusted under 35 U.S.C. 154(b) by 0 days.

(21) Appl. No.: 10/013,389

(22) Filed: Dec. 13, 2001

(65) Prior Publication Data

US 2002/0074854 A1 Jun. 20, 2002

(30) Foreign Application Priority Data

Dec. 18, 2000 (JP) ........................................ 2000-383668

(51) Int. Cl.[7] ................................................ B60T 8/88
(52) U.S. Cl. ............................ 303/122.03; 303/122.05; 303/122; 303/9.63
(58) Field of Search ....................... 303/122.03, 122.04, 303/122.05, 122, 9.63

(56) References Cited

U.S. PATENT DOCUMENTS

| | | | |
|---|---|---|---|
| 4,789,938 A | * 12/1988 | Maehata et al. | ....... 303/122.05 |
| 5,129,713 A | * 7/1992 | Matsuda | ................ 303/122.05 |
| 5,302,008 A | * 4/1994 | Miyake et al. | ................ 303/14 |
| 5,443,306 A | * 8/1995 | Broome | ......................... 303/3 |
| 5,887,954 A | * 3/1999 | Steiner et al. | ........... 303/113.4 |
| 6,003,961 A | * 12/1999 | Binder et al. | ............... 303/191 |
| 6,161,904 A | * 12/2000 | Schmidt et al. | ........ 303/122.09 |
| 6,164,733 A | * 12/2000 | Uzzell | ........................ 303/122 |
| 6,247,762 B1 | * 6/2001 | Kusano et al. | |

FOREIGN PATENT DOCUMENTS

| | | |
|---|---|---|
| JP | 10-76925 | 3/1998 |
| JP | A 2000-25605 | 1/2000 |
| JP | A 2000-62589 | 2/2000 |

* cited by examiner

Primary Examiner—Jack Lavinder
Assistant Examiner—Mariano Sy
(74) Attorney, Agent, or Firm—Oliff & Berridge, PLC (57) ABSTRACT

A method and apparatus control target deceleration of a vehicle in response to a master cylinder pressure and the like. A controlled braking mode in which the pressure in each wheel cylinder is controlled based on the target deceleration, and a driver braking mode in which the pressure in each wheel cylinder is directly controlled by a master cylinder. When an abnormality in the braking control is detected, the ratio of the wheel braking force to the amount of driver's braking operation is gradually adjusted closer to the ratio set for the driver braking mode.

19 Claims, 8 Drawing Sheets

VEHICLE BRAKING CONTROL METHOD AND APPARATUS

INCORPORATION BY REFERENCE

The disclosure of Japanese Patent Application No. 2000-383668 filed on Dec. 18, 2000 including the specification, drawings and abstract is incorporated herein by reference in its entirety.

BACKGROUND OF THE INVENTION

1. Field of Invention

The invention relates to a braking control method and apparatus for a vehicle such as a motor vehicle or the like. More particularly, the invention relates to a braking control method and apparatus that controls the braking force based on the amount of braking operation performed on a brake operating member by an operating person.

2. Description of Related Art

A conventionally known braking control apparatus for a vehicle such as a motor vehicle or the like is a braking control apparatus described in, for example, Japanese Patent Application Laid-Open No. 2000-25605, which is designed to operate in a braking control mode in which braking force generating means for each wheel is controlled by electric-type braking control means based on the amount of braking operation of a driver performed on a brake operating member, such as a brake pedal or the like, and in a driver braking mode in which braking force is generated by transferring the operating force exerted on the brake operating member by the driver to the braking force generating means. The mode is shifted from the braking control mode to the driver braking mode if an abnormality occurs in an electric energy supply apparatus for supplying electric energy.

In general, in a braking control apparatus designed with the braking control mode and the driver braking mode, the ratio of the braking force to the amount of driver's braking operation is set to a higher value for the braking control mode than for the driver braking mode. Therefore, the conventional braking control apparatus as described above have the following problem. That is, if an abnormality occurs in the electric energy supply apparatus, the mode is switched from the braking control mode to the driver braking mode, so that the ratio of the braking force to the amount of driver's braking operation, that is, the braking effectiveness, sharply drops. Therefore, the ratio of the vehicle deceleration to the amount of driver's braking operation sharply reduces, thereby causing the driver to experience an uncomfortable feeling.

SUMMARY OF THE INVENTION

It is an object of the invention to prevent a sharp reduction in the ratio of the amount of a driver's braking operation to the vehicle deceleration and therefore a discomfort to the driver by preventing a sharp drop in the ratio of the braking force to the amount of the driver's braking operation when a mode is switched from a controlled braking mode to a driver braking mode.

A first aspect of the invention is a braking control method and apparatus of a vehicle including a controller having a controlled braking mode in which a target amount of braking control is calculated based on an amount of braking operation performed by a driver on a braking member and a valve is controlled based on the target amount of braking control, and a driver braking mode in which a braking force is generated by transferring an operating force exerted on the braking member by the driver to the valve. The controller predicts an abnormal state in which continuation of a control of the braking force in the controlled braking mode is impossible, and switches from the controlled braking mode to the driver braking mode if the abnormal state is predicted. The controller adjusts a ratio of the braking force generated by the valve to the amount of braking operation of the driver closer to a ratio set for the driver braking mode before the controlled braking mode is switched to the driver braking mode.

According to the first aspect of the invention, if an abnormal state in which the control of the braking force in the controlled braking mode cannot be continued is predicted, the controlled braking mode is switched to the driver braking mode by the controller. However, before the switch from the controlled braking mode to the driver braking mode, the ratio of the braking force generated by the controller to the amount of braking operation of the driver is adjusted closer to the ratio set for the driver braking mode by the controller. Therefore, the braking control apparatus reliably prevents an occurrence where the ratio of the braking force generated by the valve to the amount of braking operation of the driver sharply falls at the time of switching from the controlled braking mode to the driver braking mode.

A second aspect of the invention is a braking control method and apparatus of a vehicle including a controller having a controlled braking mode in which a target amount of braking control is calculated based on an amount of braking operation performed by a driver on a braking member and valves are controlled based on the target amount of braking control, and a driver braking mode in which a braking force is generated by transferring an operating force exerted on the braking member by the driver to the valves. At the time of an abnormal state in which continuation of a control of the braking force in the controlled braking mode is impossible, the braking control apparatus switches the controlled braking mode to the driver braking mode by the controller. The controller predicts an abnormal state. The controller adjusts the ratio of the braking force generated by the valves to the amount of braking operation of the driver closer to the ratio set for the controlled driver mode if the abnormal state is predicted during the controlled braking mode.

According to the second aspect of the invention, if an abnormal state in which the control of the braking force in the controlled braking mode cannot be continued is predicted, the ratio of the braking force generated by the valves to the amount of braking operation of the driver is adjusted closer to the ratio set for the driver braking mode by the controller. Therefore, if the controlled braking mode is switched to the driver braking mode upon occurrence of the abnormal state in which the control of the braking force in the controlled braking mode cannot be continued, the ratio of the braking force generated by the valves to the amount of braking operation of the driver is reliably prevented from sharply falling.

In the first and second aspects, the controller may adjust the ratio of the braking force generated by the valves to the amount of braking operation of the driver closer to the ratio set for the driver braking mode by reducing a ratio of the target amount of braking control to the amount of braking operation of the driver.

It is possible to easily and reliably adjust the ratio of the braking force generated by the valves to the amount of braking operation of the driver closer to the ratio set for the driver braking mode by adjusting the ratio of the braking force generated by the valves to the amount of braking operation of the driver closer to the ratio set for the driver braking mode by reducing the ratio of the target amount of braking control to the amount of braking operation of the driver. To the contrary, it is difficult to adjust the ratio of the braking force generated where the amount of braking operation caused by the driver serves as a basis for calculating the target amount of braking control, or a case where the braking force generated by the valves is reduced for correction.

In the second aspect of the invention, the controller can operate on an electric energy supplied from an electric energy source, and the controller can predict an abnormality in the electric energy source.

The controller operates on electric energy supplied from the electric energy source and can predict an abnormality in the electric energy source. The ratio of the braking force generated by the valves to the amount of braking operation of the driver can be reliably adjusted by the controller closer to the ratio set for the driver braking mode even if the braking control mode is switched to the driver braking mode due to an abnormality in the electric energy source.

Furthermore, the electric energy source may have a first electric energy source and a second electric energy source, and the controller may predict an abnormality in the electric energy source by detecting a dangerous condition of one of the first electric energy source and the second electric energy source losing a function thereof.

If an abnormality in the electric energy source is detected by detecting a danger of one of the first and second electric energy sources losing a function thereof, the ratio of the braking force generated by the valves to the amount of braking operation of the driver can be adjusted closer to the ratio set for the driver braking mode even if the controlled braking mode is switched to the driver braking mode due to the other one of the electric energy sources losing its function as well.

BRIEF DESCRIPTION OF THE DRAWINGS

The objects, features and advantages of the invention will become apparent from the following description of exemplary embodiments with reference to the accompanying drawings, wherein like numerals are used to represent like elements and wherein.

DETAILED DESCRIPTION OF EXEMPLARY EMBODIMENTS

Exemplary embodiments of the invention will be described in detail hereinafter with reference to the accompanying drawings.

Figure 1:
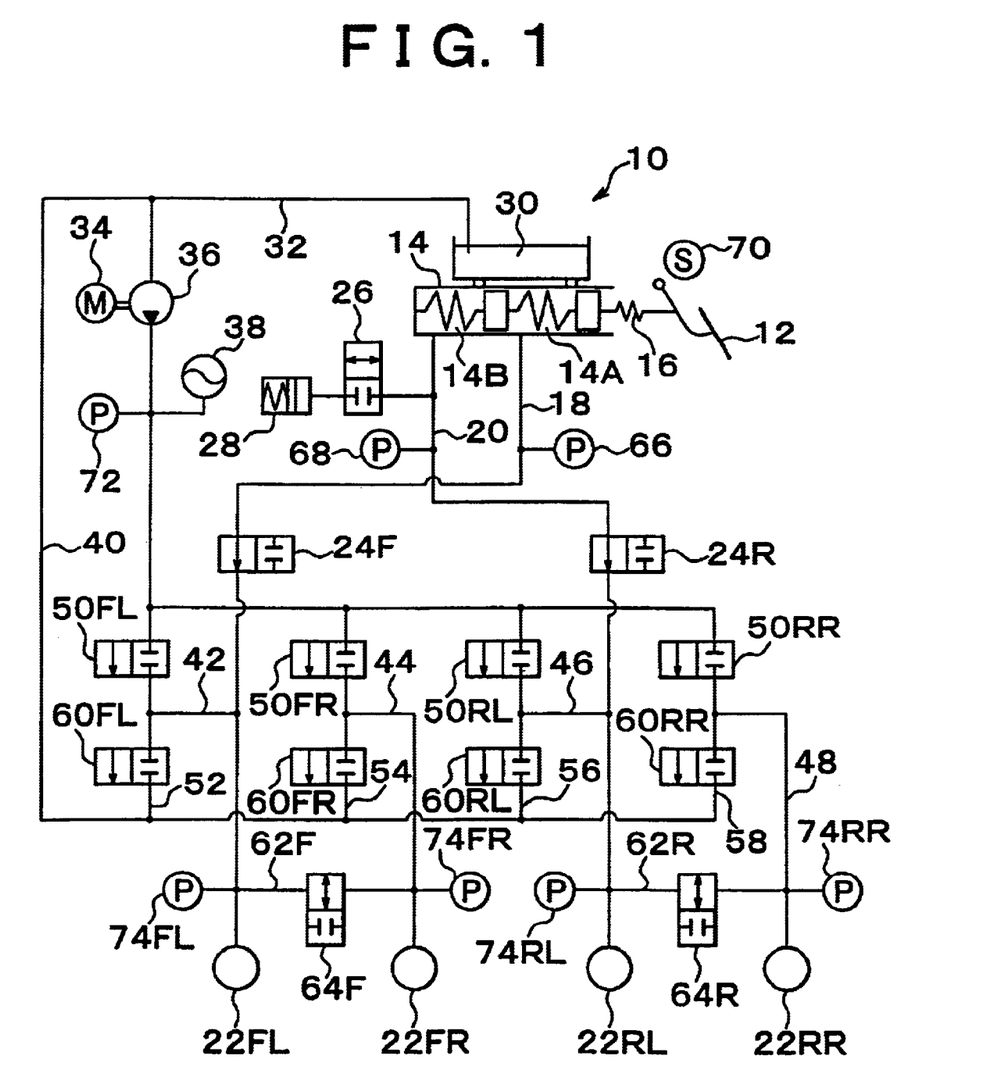
FIG. 1 is a schematic diagram illustrating a hydraulic circuit in a first embodiment of the vehicle braking control apparatus of the invention.
Figure 2:
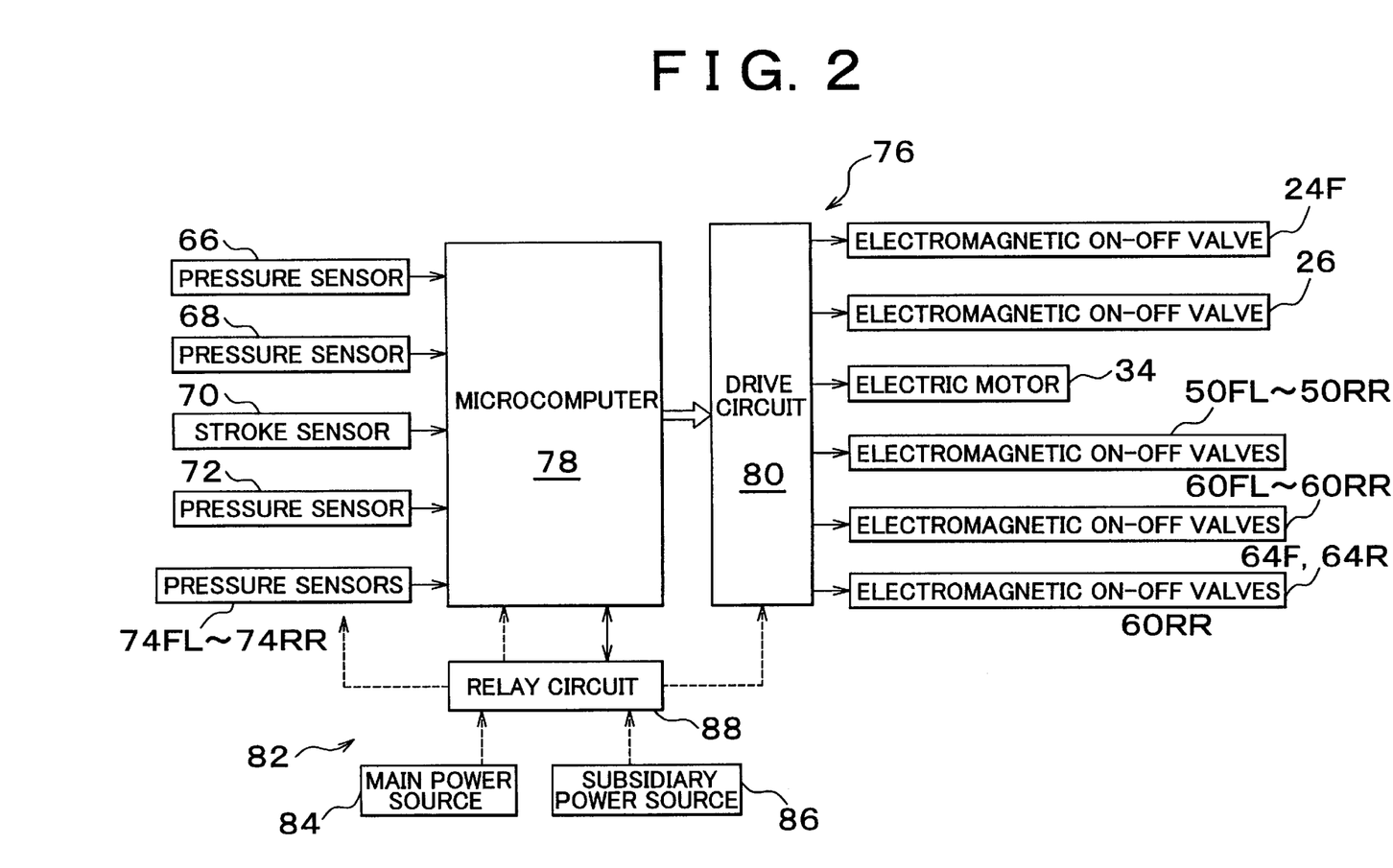
FIG. 2 is a block diagram illustrating an electronic control unit in the first embodiment shown in FIG. 1.

FIG. 1 is a schematic diagram illustrating a hydraulic circuit in a first embodiment of the vehicle braking control apparatus of the invention. FIG. 2 is a block diagram illustrating an electronic control unit 76 (or controller) in the first embodiment shown in FIG. 1. In FIG. 1, solenoids of electromagnetic on-off valves are omitted for the purpose of simplifying the illustration.

In FIG. 1, an electrically controlled hydraulic brake apparatus 10 has a master cylinder 14 that delivers brake oil in accordance with the depressing operation performed on a brake pedal 12 by a driver. A dry stroke simulator 16 is disposed between the brake pedal 12 and the master cylinder 14.

The master cylinder 14 has a first master cylinder chamber 14A and a second master cylinder chamber 14B to which a front-wheel brake oil pressure supply conduit 18 and a rear-wheel brake oil pressure supply conduit 20 are respectively connected at their one-side ends. The other ends of the front-wheel and rear-wheel brake oil pressure supply conduits 18, 20 are connected to wheel cylinders 22FL, 22RL that control the braking force on the front left wheel and the rear left wheel, respectively.

Electromagnetic on-off valves (master cut valves) 24F, 24R of a normally open type are provided in intermediate portions of the brake oil pressure supply conduits 18, 20, respectively. The electromagnetic on-off valves 24F, 24R function as breakers that control the connection of the first master cylinder chamber 14A and the second master cylinder chamber 14B with their corresponding wheel cylinders. A wet stroke simulator 28 is connected to the rear-wheel brake oil pressure supply conduit 20 extending between the master cylinder 14 and the electromagnetic on-off valve 24R, via a normally closed type electromagnetic on-off valve 26.

The master cylinder 14 is connected to a reservoir 30 to which an end of an oil pressure supply conduit 32 is connected. An oil pump 36 that is driven by an electric motor 34 is provided in partway of the oil pressure supply conduit 32. An accumulator 38 for accumulating a high pressure is connected to the oil pressure supply conduit 32 on the ejection side of the oil pump 36. An oil pressure discharge conduit 40 is connected at an end thereof to the oil pressure supply conduit 32 between the reservoir 30 and the oil pump 36.

The oil pressure supply conduit 32 on the ejection side of the oil pump 36 is connected to the front-wheel brake oil pressure supply conduit 18 between the electromagnetic on-off valve 24F and the wheel cylinder 22FL via an oil pressure control conduit 42, and is connected to a wheel cylinder 22FR for a front right wheel via an oil pressure control conduit 44, and is connected to the rear-wheel brake oil pressure supply conduit 20 between the electromagnetic on-off valve 24R and the wheel cylinder 22RL via an oil pressure control conduit 46, and is connected to a wheel cylinder 22RR for a rear right wheel via an oil pressure control conduit 48.

Electromagnetic on-off valves 50FL, 50FR, 50RL, 50RR of a normally closed type are provided in intermediate portions of the oil pressure control conduits 42, 44, 46, 48, respectively. The oil pressure control conduits 42, 44, 46, 48 on the wheel cylinder 22FL, 22FR, 22RL, 22RR-side of the electromagnetic on-off valves 50FL, 50FR, 50RL, 50RR are connected to the oil pressure discharge conduit 40 via oil pressure control conduits 52, 54, 56, 58, respectively. Electromagnetic on-off valves 60FL, 60FR, 60RL, 60RR are provided in intermediate portions of the oil pressure control conduits 52, 54, 56, 58, respectively.

The electromagnetic on-off valves 50FL, 50FR, 50RL, 50RR function as pressure increase control valves for the wheel cylinders 22FL, 22FR, 22RL, 22RR, respectively. The electromagnetic on-off valves 60FL, 60FR, 60RL, 60RR function as pressure decrease control valves for the wheel cylinders 22FL, 22FR, 22RL, 22RR, respectively. Therefore, these electromagnetic on-off valves cooperate with each other, and form pressure adjusting apparatus that control the supply and discharge of high-pressure oil with respect to the corresponding wheel cylinders via the accumulator 38 so as to increase and decrease the wheel cylinder pressures.

The front-wheel brake oil pressure supply conduit 18 and the front right-wheel oil pressure control conduit 44 are interconnected at positions near the corresponding wheel cylinders 22FL, 22FR, via a connecting conduit 62F. A normally closed type electromagnetic on-off valve 64F is provided in an intermediate portion of the connecting conduit 62F. The connecting conduit 62F and the electromagnetic on-off valve 64F function as a communication control device for controlling communication between the wheel cylinders 22FL, 22FR.

Likewise, the rear-wheel brake oil pressure supply conduit 20 and the rear right-wheel oil pressure control conduit 48 are interconnected at positions near the corresponding wheel cylinders 22RL, 22RR, via a connecting conduit 62R. A normally closed type electromagnetic on-off valve 64R is provided in an intermediate portion of the connecting conduit 62R. The connecting conduit 62R and the electromagnetic on-off valve 64R function as a communication control device for controlling communication between the wheel cylinders 22RL, 22RR.

As shown in FIG. 1, the front-wheel brake oil pressure supply conduit 18 between the first master cylinder chamber 14A and the electromagnetic on-off valve 24F is provided with a pressure sensor 66 for detecting the pressure in the control conduit 18 as a first master cylinder pressure Pm1. Likewise, the rear-wheel brake oil pressure supply conduit 20 between the second master cylinder chamber 14B and the electromagnetic on-off valve 24R is provided with a pressure sensor 68 for detecting the pressure in the control conduit 20 as a second master cylinder pressure Pm2.

A brake pedal 12 is provided with a stroke sensor 70 for detecting the brake pedal depressing stroke St caused by a driver. The oil pressure supply conduit 32 on the ejection side of the electric motor 34 is provided with a pressure sensor 72 that outputs the pressure in the conduit as an accumulator pressure Pa.

The brake oil pressure supply conduits 18, 20 between the electromagnetic on-off valves 24F, 24R and the wheel cylinders 22FL, 22RL are provided with pressure sensors 74FL, 74RL that detect the pressures in the corresponding conduits as pressures Pf1, Pr1 in the wheel cylinders 22FL, 22RL. The oil pressure control conduits 44, 48 between the electromagnetic on-off valves 50FR, 50RR and the wheel cylinders 22FR, 22RR are provided with pressure sensors 74FR, 74RR that detect the pressures in the corresponding conduits as pressures Pfr, Prr in the wheel cylinders 22FR, 22RR.

The electromagnetic on-off valves 24F, 24R, the electromagnetic on-off valve 26, the electric motor 34, the electromagnetic on-off valves 50FL, 50FR, 50RL, 50RR, the electromagnetic on-off valves 60FL, 60FR, 60RL, 60RR, and the electromagnetic on-off valves 64F, 64R are controlled by an electric control unit 76 as described in detail below. The electric control unit 76 is formed by a microcomputer 78, a drive circuit 80, and a power source 82.

In the embodiment shown in FIGS. 1 and 2, in particular, the power source 82 includes a main power source 84, a subsidiary power source 86, and a relay circuit 88. Although not illustrated in detail in FIG. 2, the main power source 84 and the subsidiary power source 86 each have a battery, an alternator, etc. The main power source 84 has a greater charge capacity than the subsidiary power source 86. The relay circuit 88 supplies drive current from the main power source 84 to the electromagnetic on-off valve 24F and the like (normal mode) if the voltage Vem of the main power source 84 is greater than or equal to a reference value Vemh (positive constant). If the voltage Vem of the main power source 84 is less than the reference value Vemh, the relay circuit 88 supplies drive current from the subsidiary power source 86 to the electromagnetic on-off valve 24F and the like (backup mode).

During a non-control time, that is, when no drive current is supplied to the electromagnetic on-off valves or the electric motor 34, the electromagnetic on-off valves 24F, 24R and the electromagnetic on-off valves 64F, 64R are maintained in the open state, and the electromagnetic on-off valve 26, the electromagnetic on-off valves 50FL, 50FR, 50RL, 50RR, and the electromagnetic on-off valves 60FL, 60FR, 60RL, 60RR are maintained in the closed state. Thus, the brake apparatus 10 is set to a driver braking mode in which the pressure in the wheel cylinder 22FL to 22RR of each wheel is controlled by the master cylinder 14.

Although not illustrated in detail in FIG. 2, the microcomputer 78 may have an ordinary construction, for example, which includes a central processing unit (CPU), a read-only memory (ROM), a random access memory (RAM), and an input/output port device that are interconnected by a bidirectional common bus.

The electric control unit 76 can be implemented as a programmed general purpose computer. It will be appreciated by those skilled in the art that the electric control unit can be implemented using a single special purpose integrated circuit (e.g., ASIC) having a main or central processor section for overall, system-level control, and separate sections dedicated to performing various different specific computations, functions and other processes under control of the central processor section. The electric control unit can be a plurality of separate dedicated or programmable integrated or other electronic circuits or devices (e.g., hardwired electronic or logic circuits such as discrete element circuits, or programmable logic devices such as PLDs, PLAs, PALs or the like). The electric control unit can be implemented using a suitably programmed general purpose computer, e.g., a microprocessor, microcontroller or other processor device (CPU or MPU), either alone or in conjunction with one or more peripheral (e.g., integrated circuit) data and signal processing devices. In general, any device or assembly of devices on which a finite state machine capable of implementing the procedures described herein can be used as the electric control unit. A distributed processing architecture can be used for maximum data/signal processing capability and speed.

The input/output port device of the microcomputer 78 receives inputs of signals from the pressure sensors 66, 68 which indicate the first master cylinder pressure Pm1 and the second master cylinder pressure Pm2, a signal from the stroke sensor 70 which indicates the depression stroke St of the brake pedal 12, a signal from the pressure sensor 72 which indicates the accumulator pressure Pa, signals from the pressure sensors 74FL to 74RR which indicate the pressures Pi (i=fl, fr, rl, rr) in the wheel cylinders 22FL to 22RR, and a signal from the relay circuit 88 which indicates whether the supply of drive current from the power source 82 is in the normal mode or the backup mode.

Figure 3:
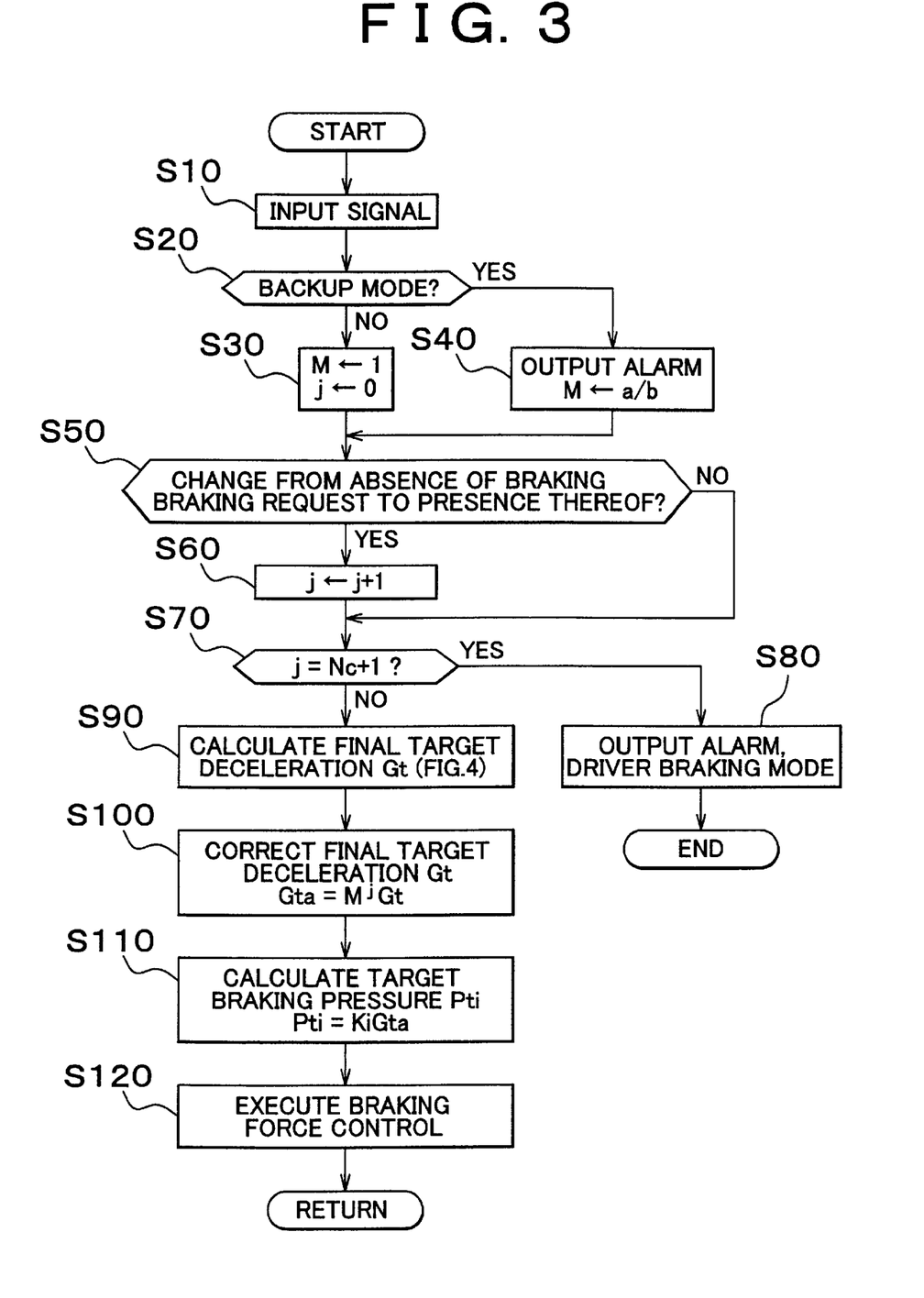
FIG. 3 is a flowchart illustrating a braking force control routine in the first embodiment.
Figure 4:
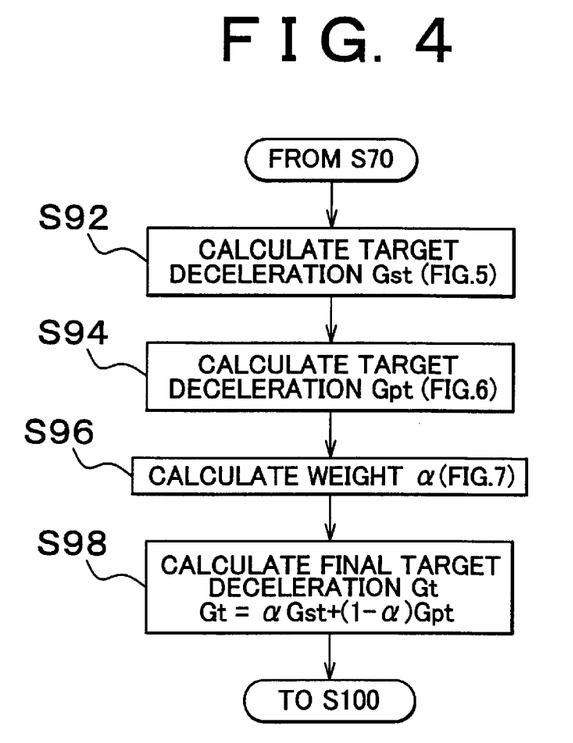
FIG. 4 is a flowchart illustrating a target deceleration calculating routine executed in step S70 in FIG. 3.

The ROM of the microcomputer 78 stores control flows, e.g., as illustrated in FIGS. 3 and 4 described below. The CPU calculates a final target vehicle deceleration Gt based on the master cylinder pressures Pm1, Pm2 detected by the pressure sensor 66, 68 and the depression stroke St detected by the stroke sensor 70. The CPU then calculates a corrected final target vehicle deceleration Gta as a multiplication product of the final target vehicle deceleration Gt and a correction factor $M^j$. The CPU calculates a target braking pressure Pti (i=fl, fr, rl, rr) for each wheel based on the corrected final target vehicle deceleration Gta, and controls the wheel cylinder pressure of each wheel so as to reach the target braking pressure Pti.

In the first embodiment shown in the figures, in particular, M in the correction factor $M^j$ is set to a/b where a and b are constants and satisfy 0<a<b<1, and j is incremented by "1" every time the state changes from a state where there is no braking request from the driver to a state where there is a braking request while the power source 82 is in the backup mode based on the subsidiary power source 86. Therefore, the corrected final target vehicle deceleration Gta is gradually decreased, so that the ratio of the wheel braking force to the amount of driver's braking operation is gradually made closer to the ratio set for the driver braking mode.

When j reaches a pre-set value Nc+1 (a predetermined positive integer), that is, when the correction factor $M^j$ becomes equal to a pre-set value, the brake apparatus 10 is switched from the braking control mode to the driver braking mode, that is, returned to a state where the braking pressure of each wheel is directly controlled by the master cylinder 14. In this case, the aforementioned value Nc may be suitably set empirically in relation to a and b so that when the correction factor $M^j$ equals MNc, the ratio of the wheel braking force to the amount of driver's braking operation becomes close to the ratio set for the driver braking mode.

Next, the braking force control in the first embodiment shown in the figures will be described with reference to flowcharts shown in FIGS. 3 and 4. The control routine illustrated by the flowcharts shown in FIGS. 3 and 4 is started when an ignition switch (not shown) is switched on. Then, the control routine is executed at every predetermined time.

First in step S10, the signal indicating the first master cylinder pressure Pm1 detected by the pressure sensor 66 and the like are inputted. In step S20, it is determined whether the power source 82 is in the backup state. That is, whether the voltage Vem of the main power source 84 is less than the reference value Vemh and therefore the electromagnetic on-off valves 50FL, etc., are supplied with drive currents from the subsidiary power source 86 via the relay circuit 88. If affirmative (YES) determination is made, the process proceeds to step 40. If negative determination (NO) is made, the process proceeds to step 30.

In step S30, M of the correction factor $M^j$ for the final target vehicle deceleration Gt described below is set to "1" and j is set to "0". In step S40, an alarm device (not shown) is actuated to output an alarm indicating that the power source 82 is in the backup state and the brake apparatus 10 may shift to the driver braking mode. Furthermore in step S40, M of the correction factor $M^j$ is set to a/b.

In step S50, it is determined whether there has been a change from the state where there is no braking request from a driver to the state where there is a braking request from a driver, based on, for example, whether the first master cylinder pressure Pm1 has changed from a value less than the reference value to a value greater than or equal to the reference value. If negative determination is made, the process immediately proceeds to step S70. If affirmative determination is made, j is incremented by "1" in step S60, and then the control routine proceeds to step S70.

In step S70, it is determined whether j has reached Nc+1. If negative determination is made, the process proceeds to step S90. If affirmative determination is made, an alarm device (not shown) is actuated to output an alarm indicating that the brake apparatus 10 is to be switched to the driver braking mode, and the brake apparatus 10 is actually switched to the driver braking mode in step S80. Then, the control routine illustrated in FIG. 3 ends.

In step S90, the final target vehicle deceleration Gt is calculated in accordance with the control routine illustrated in FIG. 4. In step S100, the final target vehicle deceleration Gt is corrected in accordance with equation (1) to determine a corrected final target vehicle deceleration Gta.

$$Gta = M^j Gt \tag{1}$$

In step S110, from the corrected final target vehicle deceleration Gta, a target braking pressure (target wheel cylinder pressure) Pti of each wheel (i=fl, fr, rl, rr) is calculated in accordance with equation (2) in which Ki (i=fl, fr, rl, rr) is a coefficient of the target braking pressure of each wheel corresponding to the corrected final target vehicle deceleration Gta. In step S120, the braking pressure of each wheel is controlled so as to reach the target braking pressure Pti. Then, the process returns to step S10.

$$Pti = Ki Gta \tag{2}$$

Figure 5:
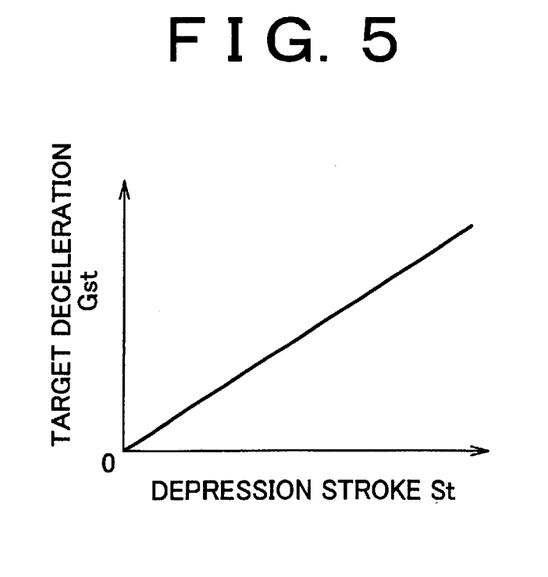
FIG. 5 is a graph indicating a relationship between the depression stroke St of a brake pedal and the target deceleration Gst.
Figure 6:
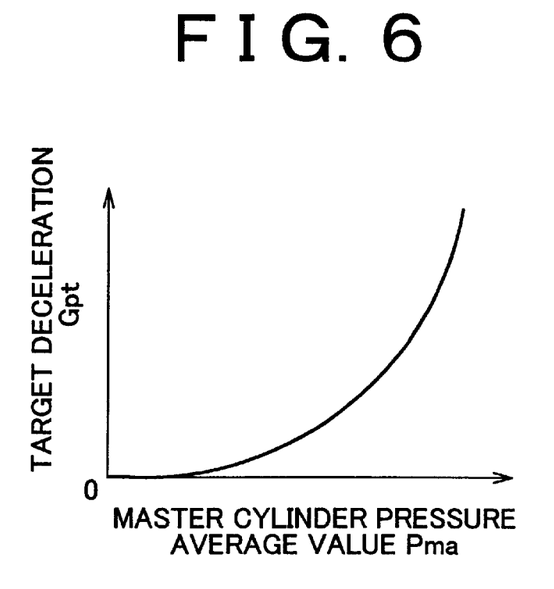
FIG. 6 is a graph indicating a relationship between the average value Pma of master cylinder pressure and the target deceleration Gpt.

A target vehicle deceleration Gt calculating routine executed in step S90 is illustrated in FIG. 4. In step S92, a target deceleration Gst based on depression stroke is calculated from the depression stroke St detected by the stroke sensor 70, with reference to a map corresponding to a graph shown in FIG. 5. In step S94, an average value Pma of the first master cylinder pressure Pm1 and the second master cylinder pressure Pm2 is calculated. From the average value Pma, a master cylinder pressure-based target deceleration Gpt is calculated with reference to a map corresponding to a graph shown in FIG. 6.

Figure 7:
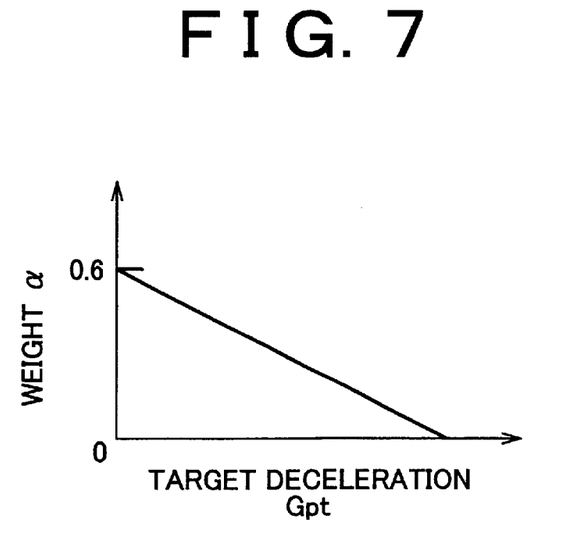
FIG. 7 is a graph indicating a relationship between the target deceleration Gpt and the weight α to the target deceleration Gst.

In step S96, on the basis of the target deceleration Gpt, a weight $\alpha$ ($0 \leq \alpha \leq 0.6$) to the target deceleration Gst is calculated with reference to a map corresponding to a graph shown in FIG. 7. In step S98, a final target deceleration Gt is calculated as a sum of the target deceleration Gpt and the weight to the target deceleration Gst as in equation (3). In the embodiment shown in the figures, the weight $\alpha$ is set within the range of 0≦α≦0.6. However, the maximum value of the weight is not limited to 0.6, but may be any value within the range of 0 to 1.

$$Gt = \alpha Gst + (1-\alpha)Gpt \quad (3)$$

Thus, according to the first embodiment illustrated in the figures, the vehicle final target deceleration Gt is calculated based on the depression stroke St and the average value Pma of the first master cylinder pressure Pm1 and the second master cylinder pressure Pm2 in step S90. In step S100, the corrected final target vehicle deceleration Gta is calculated as a multiplication product of the correction factor $M^j$ and the final target deceleration Gt. In step S110, the target braking pressure Pti for each wheel is calculated based on the corrected final target deceleration Gta. In step S120, the braking pressure on each wheel is controlled so as to become equal to the target braking pressure Pti. Thus, the braking force on each wheel is controlled in accordance with the amount of driver's braking operation.

In particular, if the power source 82 is in the normal mode, negative determination is made in step S20. Subsequently in step S30, M is set to "1", and j is set to "0", thereby setting the correction factor $M^j$ to "1". If the power source 82 is in the backup mode, the determination in step S20 is affirmative. Subsequently in step S30, an alarm is outputted indicating that the brake apparatus 10 may shift into the driver braking mode, and M of the correction factor $M^j$ is set to a/b, which is less than "1".

Every time there occurs a change from the state where there is not a braking request from a driver to the state where there is a braking request, affirmative determination is made in step S50. Subsequently in step S60, j is incremented by "1". Thus, the correction factor $M^j$ is gradually decreased. Therefore, in steps S90 to S120, the corrected final target vehicle deceleration Gta is gradually decreased, so that the ratio of the wheel braking force to the amount of driver's braking operation is gradually made closer to the ratio set for the driver braking mode.

When j reaches the pre-set value Nc+1, affirmative determination is made in step S70. Subsequently in step S80, an alarm is outputted indicating that the brake apparatus 10 will be switched to the driver braking mode, and the brake apparatus 10 is actually switched to the driver braking mode.

As can be understood from the above description, according to the first embodiment, the control of the braking force on each wheel in the braking control mode is continued by switching the power source 82 to the backup mode before the main power source 84 of the power source 82 comes to have such a low voltage that the control of the braking force on each wheel in the braking control mode becomes impossible. In this process, the ratio of the wheel braking force to the amount of driver's braking operation is gradually decreased so as to approach the ratio set for the driver braking mode, and then, the brake apparatus 10 is switched from the braking control mode to the driver braking mode. Therefore, it becomes possible to reliably prevent driver discomfort due to a sharp reduction in the effectiveness of the brake apparatus 10 occurrence at the time of mode switching.

In particular, according to the first embodiment, unless the ratio of the wheel braking force to the amount of driver's braking operation reaches a value close to the ratio set for the driver braking mode, affirmative determination is not made in step S70, and therefore, the brake apparatus 10 is not switched from the braking control mode to the driver braking mode. Hence, it is possible to reliably prevent the ratio of the wheel braking force to the amount of driver's braking operation from sharply falling at the time of switching of the brake apparatus 10 from the braking control mode to the driver braking mode.

Figure 8:
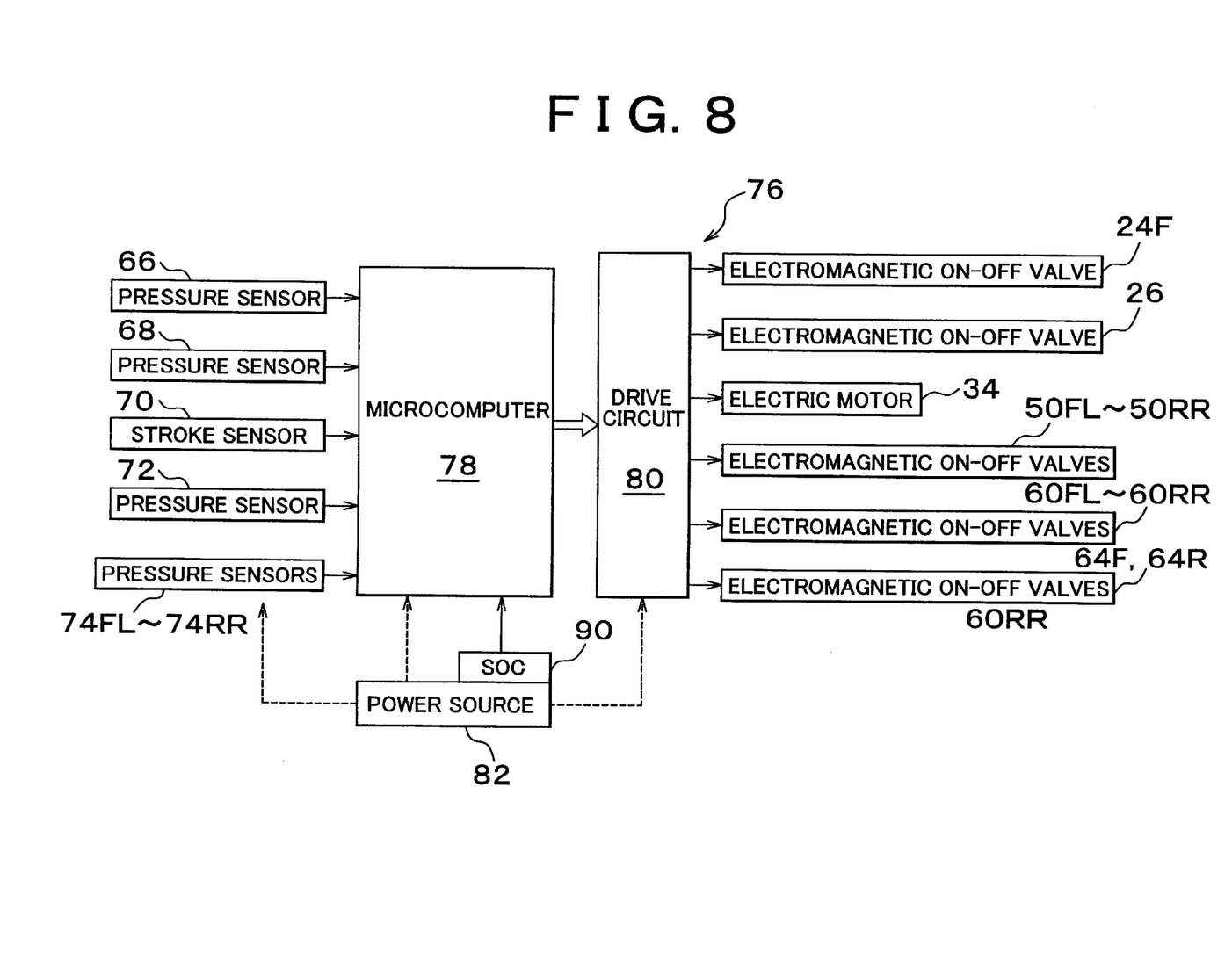
FIG. 8 is a block diagram illustrating an electronic control unit in a second embodiment of the vehicle braking control apparatus of the invention.
Figure 9:
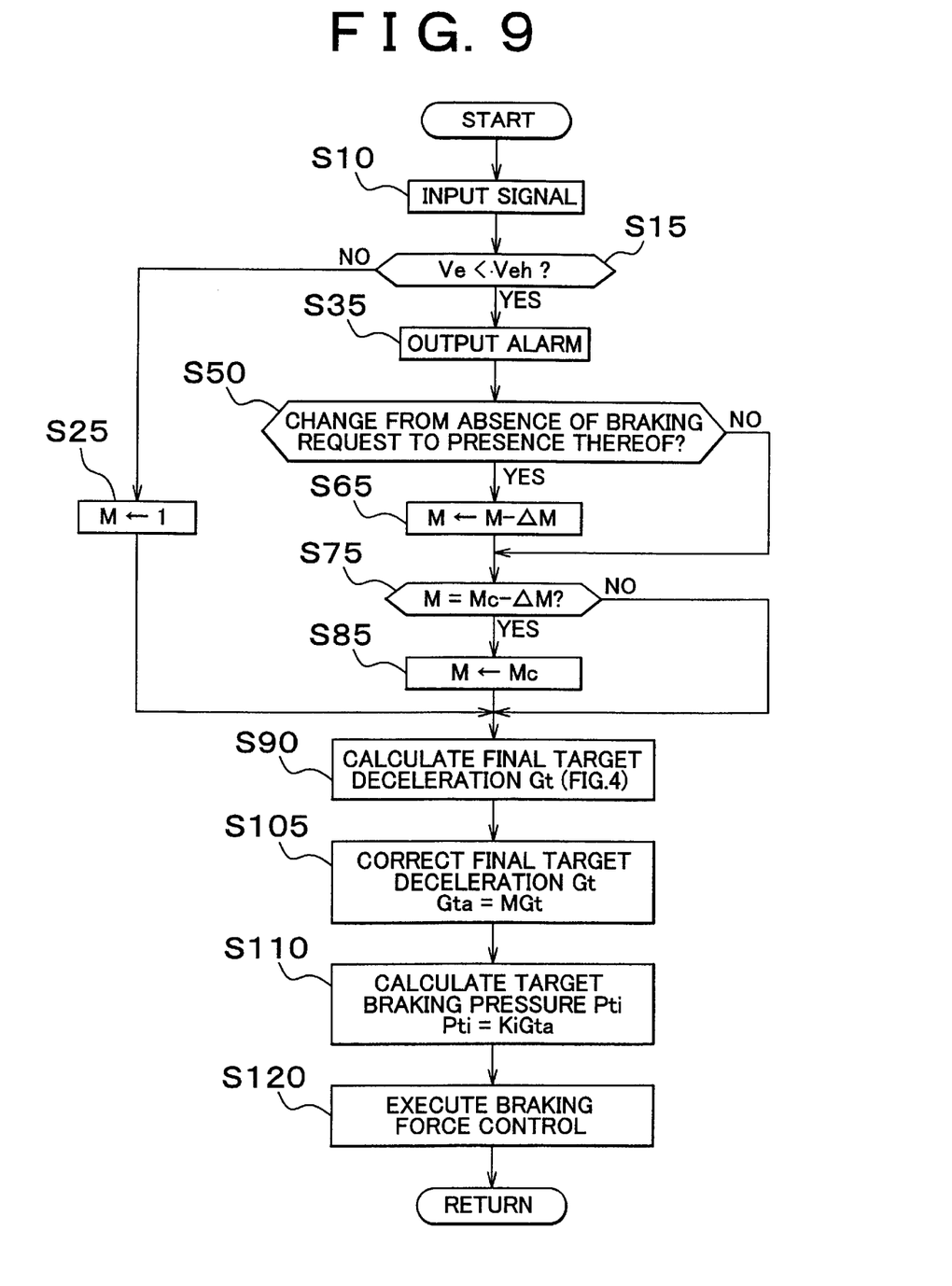
FIG. 9 is a flowchart illustrating a braking force control routine in the second embodiment.
Figure 10:
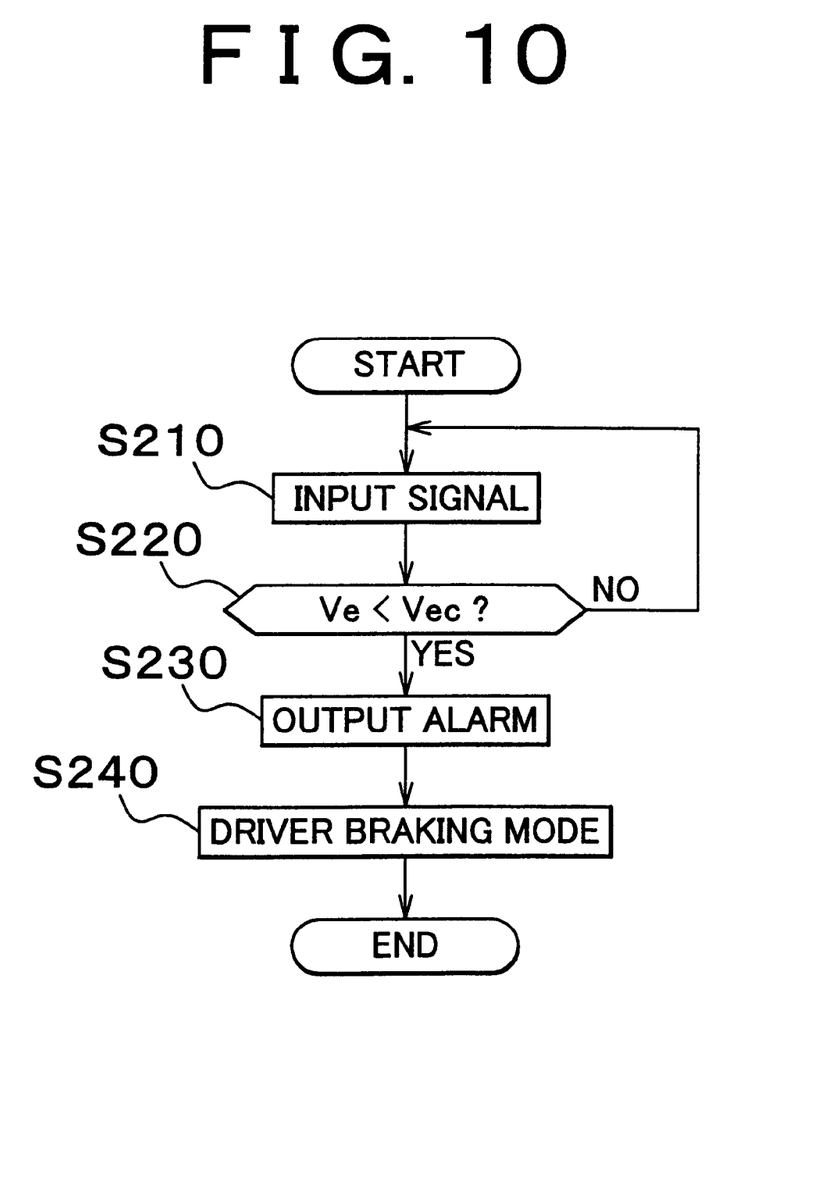
FIG. 10 is a flowchart illustrating a mode control routine in the second embodiment.

FIG. 8 is a block diagram illustrating an electronic control unit in a second embodiment of the vehicle braking control apparatus of the invention. FIG. 9 is a flowchart illustrating a braking force control routine according to the second embodiment. FIG. 10 is a flowchart illustrating a mode control routine in the second embodiment.

In FIG. 8, elements similar to those shown in FIG. 2 are represented by reference characters similar to those used in FIG. 2. In FIG. 9, steps similar to those shown in FIG. 3 are represented by numerals similar to those used in FIG. 3. The control routine illustrated in FIGS. 9 and 10 is started upon the switching-on of an ignition switch (not shown). Then, the control routine is executed at every predetermined time.

In the second embodiment, a power source 82 is formed by a single power source. The voltage Ve of the power source 82 is detected by an SOC meter 90, and a signal indicating the voltage Ve is inputted to a microcomputer 78 of an electric control unit 76. Although not shown in FIG. 8, the microcomputer 78 of the electric control unit 76 in the second embodiment incorporates a non-volatile backup memory. If the ignition switch is opened during execution of the braking control illustrated by the flowchart shown in FIG. 9, the value of the correction factor M at that time is stored into the backup memory. The stored value is read the next time the vehicle starts to run.

Furthermore, as illustrated in FIG. 9, in step S15 in the second embodiment, it is determined whether the voltage Ve of the power source 82 is less than a reference value Veh (positive constant). If the determination is negative (NO), that is, if it is determined that the voltage of the power source 82 has not dropped, the correction factor M is set to "1" in step S25 followed by step S90. Conversely, if the determination is affirmative (YES), that is, if it is determined that the voltage of the power source 82 has dropped, an alarm is outputted indicating that the brake apparatus 10 may enter a driver braking mode in step S35 followed by step S50.

In step S50, a determining process, such as in the first embodiment, is performed. If the determination is negative, that is, if it is determined that the change from the state where there is no braking request from a driver to the state where there is a braking request has not occurred, the process immediately proceeds to step S75. Conversely, if the determination is affirmative, that is, it is determined that the change from the state where there is no braking request from a driver to the state where there is a braking request has occurred, the correction factor M is decremented by ΔM that is a small positive constant. Then, the control routine to step S75.

In step S75, it is determined whether the correction factor M has become equal to a reference value Mc−ΔM where Mc is a positive constant that is smaller than "1". If affirmative determination is made, the correction factor M is set to Mc in step S85 followed by steps S90 to S120. Conversely, if negative determination is made, steps S90 to S120 are immediately executed. In this manner, the braking pressure on each wheel is controlled so as to reach a target braking pressure Pti.

In step S105 subsequent to step S90, a corrected final target vehicle deceleration Gta is calculated as a multiplication product of the correction factor M and the final target deceleration Gt as in equation (4):

$$Gta = MGt \quad (4)$$

In step S210 of the mode control routine illustrated in FIG. 10, the signal indicating the voltage Ve of the power source 82 is read. In step S220, it is determined whether the voltage Ve is less than a second reference value Vec (positive constant) that is smaller than the reference value Veh. If negative determination is made in step S220, the process returns to step S210. If affirmative determination is made, an alarm is output indicating that the brake apparatus 10 will be switched to the driver braking mode in step S230. Subsequently in step S240, the brake apparatus 10 is switched to the driver braking mode.

Thus, according to the second embodiment, the vehicle final target deceleration Gt is calculated based on the depression stroke St and the average value Pma of the first master cylinder pressure Pm1 and the second master cylinder pressure Pm2 in step S90. In step S105, the corrected final target vehicle deceleration Gta is calculated as a multiplication product of the correction factor M and the final target deceleration Gt. In step S110, the target braking pressure Pti for each wheel is calculated based on the corrected final target deceleration Gta. In step S120, the braking pressure on each wheel is controlled so as to become equal to the target braking pressure Pti. Thus, the braking force on each wheel is controlled in accordance with the amount of driver's braking operation.

In particular, if the voltage of the power source 82 is normal, negative determination is made in step S15. Subsequently in step S25, the correction factor M is set to "1". Conversely, if the voltage of the power source 82 is low, the determination in step S15 is affirmative. Subsequently in step S35, an alarm is outputted indicating that the brake apparatus 10 may shift into the driver braking mode.

If the voltage of the power source 82 has become low, affirmative determination is made in step S50 every time the change from the state where there is not a braking request from a driver to the state where there is a braking request occurs. Subsequently in steps S65 to S85, the correction factor M is gradually decreased to Mc by a decrement of ΔM, and then is held at Mc. Therefore, in steps S90 to S120, the corrected final target vehicle deceleration Gta is gradually decreased, so that the ratio of the wheel braking force to the amount of driver's braking operation is gradually made closer to the ratio set for the driver braking mode, and is held at the lowest ratio.

Furthermore, in the second embodiment, if the voltage Ve of the power source 82 decreases below the second reference value Vec, affirmative determination is made in step S220 of the mode control routine illustrated in FIG. 10. Subsequently in steps S230 and S240, the alarm is outputted and then the brake apparatus 10 is switched to the driver braking mode.

According to the second embodiment mentioned above, the ratio of the wheel braking force to the amount of driver's braking operation is gradually decreased so as to approach the ratio set for the driver braking mode before the voltage of the power source 82 becomes so low that the control of the braking force on each wheel in the braking control mode becomes impossible. Therefore, discomfort to a driver, due to a sharp reduction in the effectiveness of the brake apparatus 10, can be reliably prevented when the brake apparatus 10 is subsequently switched from the braking control mode to the driver braking mode.

In the first and second embodiments, the final target deceleration Gt of the vehicle is calculated as a target amount of braking control based on the amount of driver's braking operation. In a situation where the voltage of the power source 82 is relatively low, the correction factor is gradually decreased every time the change from a state where there is no braking request from a driver to a state where there is a braking request occurs. Thus, the corrected final target deceleration Gta, which serves as a basis for calculation of a target braking pressure Pti for each wheel, is gradually decreased. Therefore, the ratio of the wheel braking force to the amount of driver's braking operation is reduced so as to gradually approach the ratio set for the driver braking mode. Hence, in comparison with, for example, a case where the target braking pressure Pti for each wheel is gradually decreased by gradually decreasing the factor Ki, or a case where correction factors for the depression stroke St and the master cylinder pressures Pm1, Pm2 are set, and are gradually reduced, the embodiments are able to easily and properly make the ratio of the wheel braking force to the amount of driver's braking operation closer to the ratio set for the driver braking mode.

In particular, according to the second embodiment illustrated in the figures, the correction factor M is gradually reduced to Mc and is then held at Mc, and the brake apparatus 10 is not switched to the driver braking mode unless the voltage Ve of the power source 82 decreases below the second reference value Vec. Therefore, if the voltage Ve of the power source 82 becomes higher than the reference value Veh due to charging during a continuation of the braking force control in the braking control mode with the correction factor M set to Mc, the braking control mode in which the ratio of the wheel braking force to the amount of driver's braking operation is set to a normal ratio that can be recovered.

In this case, the output of an alarm discontinues so that the driver understands that the ratio of the wheel braking force to the amount of driver's braking operation will return to the normal ratio. In order to prevent discomfort to the driver due to the recovery of brake effectiveness during the return process of the ratio of the wheel braking force to the amount of driver's braking operation to the normal ratio, the ratio of the wheel braking force to the amount of driver's braking operation may be gradually returned to the normal ratio at a stage where the voltage Ve of the power source 82 has become equal to or greater than the reference value Veh, or during a process preceding such a stage.

Furthermore, according to the second embodiment, the correction factor M is reduced by ΔM at a time. Therefore, in comparison with the first embodiment, the degree of reduction in the brake effectiveness that the driver perceives, during the process of reducing the correction factor, can be reduced. Even if the vehicle stops running during the process of reducing the correction factor M, the correction factor M is gradually reduced beyond the value that occurred at the end of the previous vehicle running operation as long as the voltage Ve of the power source 82 remains below the reference value Veh. Therefore, the ratio of the wheel braking force to the amount of driver's braking operation can be reliably reduced before the brake apparatus 10 is forcibly switched to the driver braking mode due to exhaustion of the power source 82.

While the invention has been described in detail with reference to specific embodiments, it should be apparent to those skilled in the art that the invention is not limited to the above-described exemplary embodiments, but may be realized in various other embodiments within the scope of the invention.

For example, although in the first embodiment, the affirmative determination in step S70 is followed by the switching of the brake apparatus 10 to the driver braking mode in step S80, it is also possible to adopt a modification in which, as in the second embodiment, the affirmative determination in step S70 is followed by the setting of j to Nc and then by step S90, and the negative determination in step S70 is followed immediately by step S90, or a modification in which the mode of the brake apparatus 10 is controlled by a mode control routine that is modified from the mode control routine illustrated in FIG. 10 so that if it is determined in step S220 that the voltage Ves of the subsidiary power source 86 becomes less than a reference value Vesc (positive constant), the process proceeds to step S230.

Furthermore, in the second embodiment, the affirmative determination in step S75 is followed by the setting of M to Mc in step S85, and is then followed by step S90, and the mode of the brake apparatus 10 is controlled by the mode control routine illustrated in FIG. 10. However, it is also possible to adopt a modification in which, as in the first embodiment, if affirmative determination is made in step S75, an alarm is outputted to the driver as in step S80 and then the brake apparatus 10 is switched to the driver braking mode.

Further, in the foregoing embodiments, the ratio of the wheel braking force to the amount of driver's braking operation is gradually made closer to the ratio set for the driver braking mode by gradually correcting the target vehicle deceleration calculated from the amount of driver's braking operation in the decreasing direction through the use of the correction factor $M^j$ or M which is gradually reduced. In a modification, for example, the ratio of the wheel braking force to the amount of driver's braking operation may be made closer to the ratio set for the driver braking mode by gradually correcting the amount of braking operation caused by the driver, which serves as a basis for calculation of a target vehicle deceleration, in the decreasing direction, or by gradually decreasing the factor Ki for calculating the target braking pressure for each wheel based on the target deceleration of the vehicle.

Furthermore, in the foregoing embodiments, the braking pressure for each wheel is controlled by the target braking pressure calculated from the average value Pma of the first and second master cylinder pressures and the depression stroke St of the brake pedal. However, the target braking pressure for each wheel may be calculated in any manner known in the art as long as the target braking pressure for each wheel is controlled based on the amount of driver's braking operation during a normal control.

Furthermore, in the foregoing embodiments, the electromagnetic on-off valves 64F, 64R are opened in cooperation with the connecting conduits 62F, 62R so as to interconnect the left and right front wheel cylinders 22FL, 22FR and the right and left rear wheel cylinders 22RL, 22RR during the driver braking mode. However, the electromagnetic on-off valves 64F, 64R and the connecting conduits 62F, 62R may be omitted as long as the pressure in the wheel cylinder of each wheel is directly controlled by the master cylinder 14 during the driver braking mode Furthermore, the brake apparatus may have any other construction known in the art as long as the master cylinder and the wheel cylinder of each wheel are disconnected from each other during the braking control mode, and the master cylinder and the wheel cylinder of each wheel are directly interconnected during the driver braking mode.

While the invention has been described with reference to what are presently considered to be exemplary embodiments thereof, it is to be understood that the invention is not limited to the disclosed embodiments or constructions. On the contrary, the invention is intended to cover various modifications and equivalent arrangements. In addition, while the various elements of the disclosed invention are shown in various combinations and configuration, which are exemplary, other combinations and configurations, including more, less or only a single embodiment, are also within the spirit and scope of the invention.

What is claimed is:

1. A braking control apparatus of a vehicle, comprising:
   a controller that controls a valve provided for each wheel, in a controlled braking mode in which a target amount of braking control is calculated based on an amount of braking operation performed by a driver on a braking member such that the valve is controlled based on the target amount of braking control, and in a driver braking mode in which a braking force is generated by transferring an operating force exerted on the braking member by the driver to the valve; and
   wherein the controller:
      predicts an abnormal state in which continuation of a control of the braking force in the controlled braking mode is impossible;
      switches from the controlled braking mode to the driver braking mode if the abnormal state is predicted; and
      adjusts a ratio of the braking force generated by the valve to the amount of braking operation of the driver, which the ratio is adjusted closer to a predetermined ratio set for the driver braking mode before the controlled braking mode is switched to the driver braking mode.

2. A braking control apparatus according to claim 1, wherein the controller adjusts the ratio of the braking force generated by the valve to the amount of braking operation of the driver by reducing a ratio of the target amount of braking control to the amount of braking operation of the driver.

3. A braking control apparatus according to claim 2,
   wherein the target amount of braking control is a target deceleration of the vehicle, and
   wherein the controller adjusts the ratio of the braking force generated by the valve to the amount of braking operation of the driver by correcting the target deceleration in a decreasing direction.

4. A braking control apparatus according to claim 1, wherein the target amount of braking control is a target deceleration of the vehicle.

5. A braking control apparatus of a vehicle, comprising:
   a controller that controls valves provided for each wheel, in a controlled braking mode in which a target amount of braking control is calculated based on an amount of braking operation performed by a driver on a braking member such that the valves are controlled based on the target amount of braking control, and in a driver braking mode in which a braking force is generated by transferring an operating force exerted on the braking member by the driver to the valves; and
   wherein the controller:
      predicts an abnormal state; and
      switches from the controlled braking mode to the driver braking mode if the abnormal state occurs in which continuation of a control of the braking force in the controlled braking mode is impossible, wherein the controller adjusts a ratio of the braking force generated by the valves to the amount of braking operation of the driver, which the ratio is adjusted closer to a ratio set for the driver braking mode if the abnormal state is predicted during the braking control mode.

6. A braking control apparatus according to claim 5, wherein the controller adjusts the ratio of the braking force generated by the valves to the amount of braking operation of the driver by reducing a ratio of the target amount of braking control to the amount of braking operation of the driver.

7. A braking control apparatus according to claim 6,
wherein the target amount of braking control is a target deceleration of the vehicle, and
wherein the controller adjusts the ratio of the braking force generated by the valves to the amount of braking operation of the driver by correcting the target deceleration in a decreasing direction.

8. A braking control apparatus according to claim 6,
wherein the controller operates on an electric energy supplied from an electric energy source, and
wherein the controller predicts an abnormality in the electric energy source.

9. A braking control apparatus according to claim 8, wherein the electric energy source is an electric power source that comprises a battery, and
wherein the controller predicts an abnormality in the electric power source by detecting a reduction in a voltage of the battery of the electric power source.

10. A braking control apparatus according to claim 8,
wherein the electric energy source has a first electric energy source and a second electric energy source, and
wherein the controller predicts an abnormality in the electric energy source by detecting a danger of one of the first electric energy source and the second electric energy source.

11. A braking control apparatus according to claim 10,
wherein each of the first electric energy source and the second electric energy source is an electric power source that comprises a battery, and
wherein if a voltage of the battery of one of the electric power sources becomes less than a reference value, electric energy is supplied from another one of the electric power sources, and
wherein the controller predicts an abnormality of one of the electric powers source by detecting a state in which electric energy is supplied from another one of the electric power sources.

12. A braking control apparatus according to claim 5, wherein the target amount of braking control is a target deceleration of the vehicle.

13. A braking control apparatus according to claim 5,
wherein the controller operates on an electric energy supplied from an electric energy source, and
wherein the controller switches from the controlled braking mode to the driver braking mode if an abnormality occurs in the electric energy source.

14. A braking control apparatus according to claim 13, wherein the electric energy source is an electric power source that comprises a battery, and the controller switches from the controlled braking mode to the driver braking mode if a decrease in a voltage of the battery of the electric power source is detected.

15. A braking control apparatus according to claim 13,
wherein the electric energy source has two electric power sources each of which comprises a battery, and
wherein if a voltage of the battery of one of the electric power sources becomes less than a reference value, electric energy is supplied from another one of the electric power sources, and wherein the controller switches from the controlled braking mode to the driver braking mode if the voltage of the battery of the another one of the electric power sources becomes less than the reference value.

16. A method for braking a vehicle, comprising:
controlling valves provided for each wheel, in a controlled braking mode in which a target amount of braking control is calculated based on an amount of braking operation performed by a driver on a braking member such that the valve is controlled based on the target amount of braking control, and in a driver braking mode in which a braking force is generated by transferring an operating force exerted on the braking member by the driver to the valve;
predicting an abnormal state in which continuation of a control of the braking force in the controlled braking mode is impossible;
switching from the controlled braking mode to the driver braking mode if the abnormal state is predicted; and
adjusting a ratio of the braking force generated by the braking force to the amount of braking operation of the driver, which the ratio is adjusted closer to a predetermined ratio set for the driver braking mode before the controlled braking mode is switched to the driver braking mode.

17. A method for braking a vehicle according to claim 16, further comprising:
adjusting the ratio of the braking force generated by the valve to the amount of braking operation of the driver by reducing a ratio of the target amount of braking control to the amount of braking operation of the driver.

18. A method for braking a vehicle according to claim 17, wherein the target amount of braking control is a target deceleration of the vehicle, and wherein the method further comprises:
adjusting the ratio of the braking force generated by the valve to the amount of braking operation of the driver by correcting the target deceleration in a decreasing direction.

19. A method for braking a vehicle, comprising:
controlling valves provided for each wheel, in a controlled braking mode in which a target amount of braking control is calculated based on an amount of braking operation performed by a driver on a braking member such that the valves are controlled based on the target amount of braking control, and in a driver braking mode in which a braking force is generated by transferring an operating force exerted on the braking member by the driver to the valves;
predicting an abnormal state; and
switching from the controlled braking mode to the driver braking mode if the abnormal state occurs in which continuation of a control of the braking force in the controlled braking mode is impossible,
adjusting a ratio of the braking force generated by the valves to the amount of braking operation of the driver, which the ratio is adjusted closer to a ratio set for the driver braking mode if the abnormal state is predicted during the braking control mode.

* * * * *